United States Patent

Schiefer et al.

[15] 3,670,859
[45] June 20, 1972

[54] CLUTCH AND CLUTCH COVER

[72] Inventors: Paul J. Schiefer, Sherman Oaks; James D. McFarland, Jr., Chatsworth, both of Calif.

[73] Assignee: Schiefer Manufacturing Company, Monterey, Calif.

[22] Filed: Jan. 2, 1970

[21] Appl. No.: 117

[52] U.S. Cl. .......................... 192/112, 192/70.29, 192/99 A, 192/70.19
[51] Int. Cl. ........................................ F16d 13/60
[58] Field of Search ................... 192/112, 105 C, 99 A, 70.29

[56] References Cited

UNITED STATES PATENTS 3,090,475  5/1963  Gatewood et al. ................... 192/99 A
3,162,284  12/1964  Montgomery et al. ................. 192/112

Primary Examiner—Benjamin W. Wyche
Assistant Examiner—Randall Heald
Attorney—Christie, Parker & Hale

[57] ABSTRACT

A "Long" type clutch cover has a plurality of windows for the release fingers utilized in disengaging the clutch's pressure plate from the clutch's clutch disc assembly. Each window has a pair of inwardly extending bearing flanges to increase the strength of the clutch cover to resist pressure plate imposed, rotational loads. The corners of the windows are radiused to reduce the likelihood of fatigue failure. Each pair of bearing flanges is engaged by upstanding bosses of a yoke on the pressure plate to provide the load coupling of the pressure plate with the clutch cover. The yokes also provide mounting of the release fingers to the pressure plate, the release fingers also being pivotally mounted to the clutch cover.

4 Claims, 4 Drawing Figures

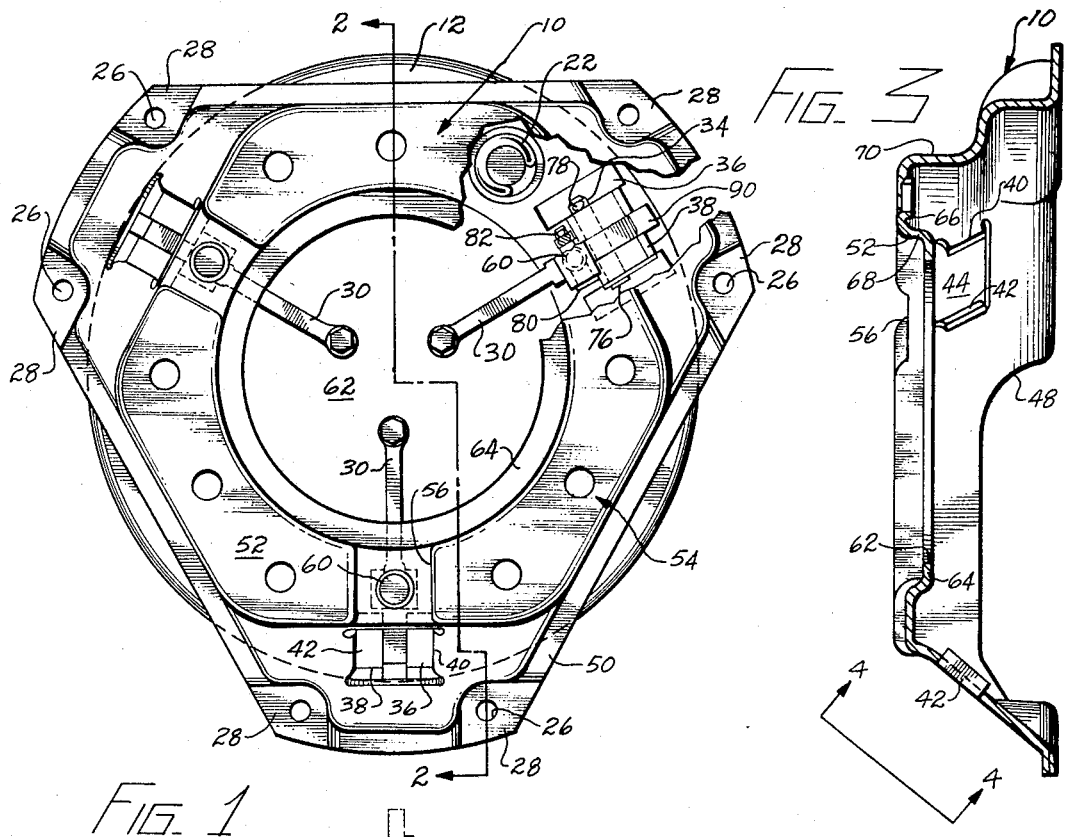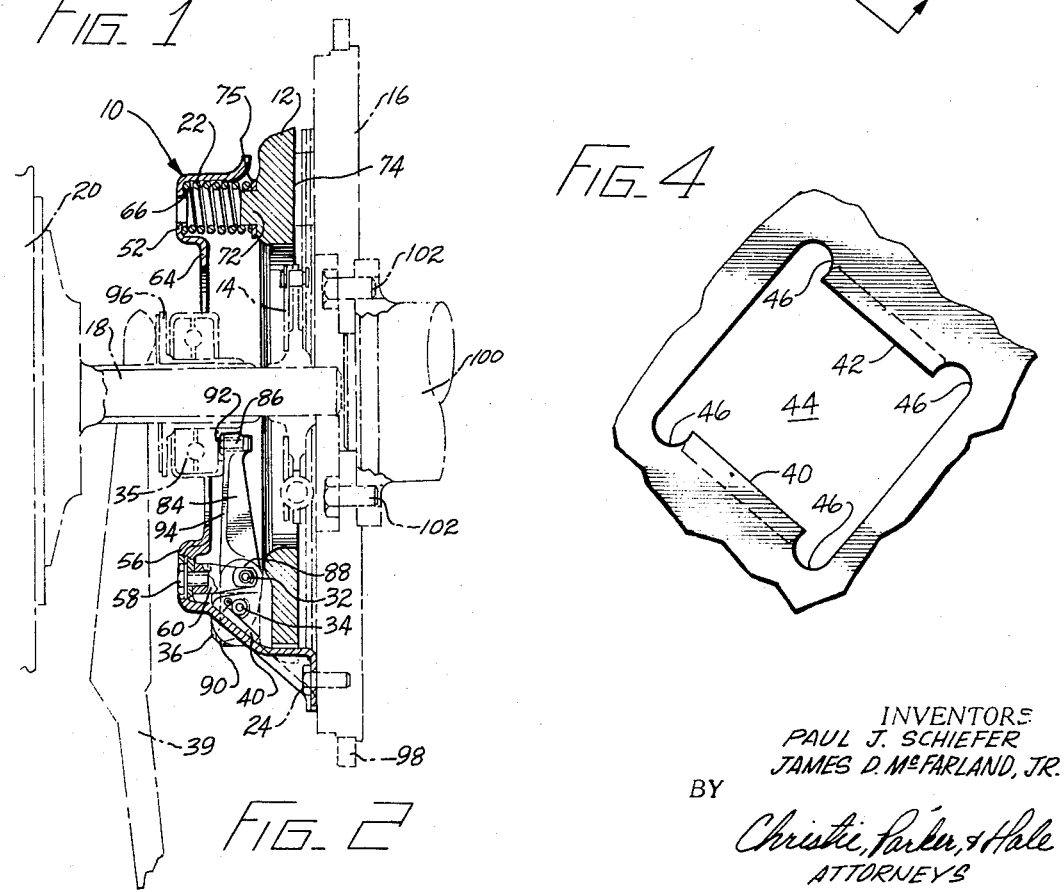

CLUTCH AND CLUTCH COVER

BACKGROUND OF THE INVENTION

The present invention relates to clutches in general and, more specifically, to an improvement in the manner a clutch cover resists rotational loads.

Release fingers are used in many types of clutches for the purpose of disengaging the clutch's pressure plate from a clutch disc assembly, and, thus, to uncouple a vehicle's engine from its drive train. The release fingers are pivotally carried by the clutch cover and are pivotally mounted to the pressure plate such that axial movement of a clutch release bearing against the release fingers in the direction of a flywheel assembly causes the release fingers to move the pressure plate out of engagement with the clutch disc assembly.

The pressure plate and clutch cover must be coupled together to prevent rotation of the pressure plate with respect to the clutch cover which would otherwise displace the compression springs used to maintain pressure plate engagement with the clutch disc assembly. Typically, the coupling is effected by engagement of bosses of the yokes which provide the pivotal coupling of the release fingers to the pressure plate and the walls of windows in the clutch cover.

It has been found that clutch failure occurs because of failure of clutch cover material in the vicinity of the windows owing to the considerable forces transmitted to the clutch cover through the mounting bosses for the release fingers by the pressure plate. Material failure in the clutch cover allows rotational movement of the pressure plate with respect to the cover and the displacement of the compression springs. At a minimum, this failure prevents even and full engagement of the pressure plate with the clutch disc assembly. Moreover, fatigue failures in the clutch cover from repetitive loading of clutch cover material in the vicinity of the windows has been experienced.

SUMMARY OF THE INVENTION

The present invention provides an improved clutch and clutch cover which prevents clutch failure because of failure of clutch cover material occasioned by forces applied in the vicinity of the windows from the pressure plate, and, in preferred form, reduces the incidence of fatigue failure in the clutch cover in the vicinity of the windows.

In a specific form, the present invention contemplates a clutch cover having a drive window for each of a plurality of release fingers. Each drive window has a pair of inwardly extending bearing flanges, preferably formed of parent clutch cover material. These bearing flanges are adapted to cooperate with release finger mounting bosses of the pressure plate for the transmission of rotational loads from the pressure plate to the clutch cover to thereby avoid relative rotational movement between the two. The clutch cover is adapted for mounting on a standard flywheel and for receiving a pressure plate as well as biasing means for urging the pressure plate into engagement with a clutch disc assembly.

A preferred embodiment of the present invention provides square-shaped windows which are radiused at their corners to avoid fatigue cracks.

In a more specific form, the present invention contemplates a clutch cover having a window for each of a plurality of release fingers. As before, bearing flanges extend inwardly of the clutch cover at the windows for bearing relationship with release finger mounting bosses of the pressure plate. The corners of the windows are again radiused to avoid fatigue cracks in the clutch cover. The cover is adapted for mounting on a standard flywheel assembly as by flanges having holes for receipt of fasteners. The clutch cover also has means for receiving a plurality of compression springs which are used for urging the pressure plate into engagement with the clutch disc assembly. These means may include an inwardly turned flange for each compression spring adapted to fit within the coil of its associated spring to cooperate with an axially extending boss of the pressure plate in maintaining the spring properly aligned. The release fingers are pivotally secured, as through pins, to release finger mounting bosses of the pressure plate. Preferably, there are two mounting bosses for each release finger disposed to describe a yoke for receipt of their associated release finger between them. Each release finger is pivotally secured to the clutch cover as by another yoke permanently affixed to the cover. Each release finger has a follower for engagement by a clutch release bearing. Preferably each release finger has a centrifugal weight portion for dynamically loading the pressure plate to augment the force of the compression springs at high engine revolutions to ensure adequate engagement of the pressure plate with the clutch disc assembly.

These and other features, aspects and advantages of the present invention will become more apparent from the following description, appended claims and drawings.

BRIEF DESCRIPTION OF THE FIGURES

FIG. 1 is a top plan view of an improved clutch of the present invention which is partly broken away to illustrate the mounting of a typical clutch release finger to the pressure plate;

FIG. 2 is an elevational, sectional view taken along line 2—2 of FIG. 1 with a release finger and window omitted for the purpose of clarity and also illustrating attendant prior art apparatus used with the clutch of the present invention;

FIG. 3 is a half-sectional, elevational view of the improved clutch cover of the present invention; and FIG. 4 is a fragmentary view taken along line 4—4 of FIG. 3.

DESCRIPTION OF THE PREFERRED EMBODIMENTS

Referring briefly to FIGS. 1 and 2, the improved clutch and clutch cover of the present invention are indicated generally by reference numeral 10. The clutch cover houses a standard pressure plate 12 which is adapted to engage a standard clutch disc assembly 14 for the transmission of power from a flywheel assembly 16 to a main input shaft 18 of a transmission 20. As will be described in detail subsequently, pressure plate 12 is coupled to the clutch cover to prevent relative rotation between the two. A plurality of compression springs 22, say, nine, are disposed between the inside of clutch cover 10 and pressure plate 12 to maintain engagement of the pressure plate with clutch disc assembly 14. The clutch cover is adapted for mounting on flywheel 16 through a plurality of fasteners, typified by bolt 24 in FIG. 2, disposed in fastener holes 26 in mounting flanges 28. Three regularly disposed clutch release fingers 30 are pivotally secured to clutch cover 10 and pressure plate 12 through pins 32 and 34, respectively, such that movement of a clutch release bearing 35 in response to a clutch release lever 39 toward flywheel assembly 16 will force the pressure plate axially away from clutch disc assembly 14.

With this brief description in mind, it should be appreciated that the pressure plate and clutch cover cannot move relative to each other. If there were relative movement, compression springs 22 would be displaced resulting in uneven bearing of pressure plate 12 with clutch disc assembly 14, or even total clutch failure. To avoid relative rotation between the pressure plate and the clutch cover, the two are coupled together such that rotational forces on the pressure plate will be transmitted directly to the clutch cover. This is effected, in accordance with the present invention, through a pair of release finger mounting bosses 36 and 38 for each of the release fingers. Mounting bosses 36 and 38 are disposed to bear against bearing flanges 40 and 42, respectively, of a window 44 associated with each release finger. More specifically, each release finger has an associated window, the lateral sides of which are turned inwardly to provide bearing flanges for bearing against the sides of bosses 36 and 38. It will be noted in FIGS. and 4, especially, that each window is essentially square-shaped with the corners of the square radiused at 46. The radiusing of the corners prevents fatigue cracks from developing in the clutch cover.

In greater detail, clutch cover 10 is generally triangular shaped in plan with an opening 48 on each of its straight sides for cooling air and for pressure plate 12. Mounting is effected through pairs of fasteners disposed at the ends of each of the straight sides. A reinforcing flange 50 circumscribes the clutch cover to give it rigidity. The clutch cover has a raised portion 52 disposed on a top portion 54 which is raised above the balance of the clutch cover. At three locations around this raised portion are recesses 56 which provide for fasteners 58 used to secure yokes 60 to the clutch cover. A central opening 62 is defined by a radial flange 64 which is disposed axially inward of the raised portion. This opening provides for clutch release bearing 35 as well as transmission input shaft 18. As was previously described, each of the compression springs 22 is in compressive engagement with the inside of the clutch cover. An inwardly extending flange 66 passes interiorly of each of the compression springs to act as a mounting boss and guide. Lateral stability for each of the compression springs is enhanced because of the proximity of an inward, axially extending wall 68, formed between raised portion 52 and flange 64, and an outer axially extending wall 70.

The pressure plate is of standard design. It has a mounting boss and guide 72 for each of the compression springs 22, each compression spring being received on a mounting boss 72. The pressure plate also has a clutch disc assembly engaging surface 74 for engaging clutch disc assembly 14. A ceramic washer 75 is disposed between each compression spring 22 and the pressure plate to insulate the compression springs from the considerable heat developed during clutching operations.

As was previously mentioned, a pair of mounting bosses 36 and 38 are provided for each of the release fingers 30 and for the transmission of torque from the pressure plate to the clutch cover. Each pair of mounting bosses extends axially of the clutch and defines a radially directed space between them for receiving a portion of their associated release finger. Pin 34, which has a head 76 to keep it in place, passes through each of these bosses and is secured in place as by a carter key 78.

Each release finger is secured to clutch cover 10 through yoke 60 and pin 32. As previously mentioned, each of the yokes 60 is secured to the clutch cover by a fastener 58. Pin 32 passes through the legs of the yoke and the yoke's associated release finger for the pivotal mounting of the release finger to the clutch cover. Each pin has a head 80 for cooperating with a carter key 82 to provide bearing on the outer sides of the mounting yoke for securing the pin in place.

Each release finger has a lever portion 84, a follower portion 86, mounting boss portion 88 and a centrifugal weight portion 90. The mounting boss portion receives pin 32. Lever portion 84 extends from the mounting boss portion to the follower portion. The follower itself has a hardened follower element 92 for axial engagement with clutch release bearing 35. A reinforcing rib 94 extends on either side of lever portion 84 to provide rigidity. Centrifugal weight portion 90 extends axially away from pivot pin 34 for the dynamic loading of the pressure plate in response to centrifugal force on the centrifugally weighted portion. This dynamic loading is effected by the tendency of the centrifugally weighted portion to approach the plane of the axis of pivot pin 34.

Before proceeding to the detailed description of the operation of the improved clutch and clutch cover of the present invention, the balance of the prior art shown in FIG. 2 will be briefly described. The release bearing has a release bearing hub 96 for mounting of the release bearing on transmission input shaft 18. The transmission input shaft is splined for receipt of the release bearing hub and for receipt of clutch disc assembly 14. Obviously, the clutch disc assembly must be torsionally coupled to the input shaft for the transmission of power from the engine to the transmission. Flywheel assembly 16 includes a flywheel proper and a ring gear 98 for a starter. A crankshaft 100 leads from an engine and is secured to the flywheel as by fasteners 102.

In operation, then, when the clutch is engaged, power from the engine is transmitted to the transmission because pressure plate 12 forces clutch disc assembly 14 tightly against flywheel 16 and the clutch disc assembly drives input shaft 18. A considerable amount of torque is transmitted to the pressure plate by virtue of its engagement with the clutch disc assembly. This torque tends to rotate the pressure plate with respect to clutch cover 10. As previously mentioned, relative rotation cannot be tolerated because at a minimum it affects the alignment of the pressure plate with respect to the clutch disc assembly and the flywheel by forcing compression springs 22 askew. The pressure plate, however, is rotationally coupled to clutch cover 10 by engagement of the lateral sides of each of the mounting bosses 36 and 38 of pressure plate 12 with bearing flanges 40 and 42. The cyclic loading experienced during use of the clutch cyclically loads the clutch cover around windows 44. The effect of this cyclic loading in producing fatigue cracks in the clutch cover is overcome through radiused corners 46.

To disengage the clutch, release lever 39 forces clutch release bearing 35 towards flywheel 16 to engage follower portions 86 of release fingers 30. This forces the follower portion towards the flywheel assembly, and pivot pin 34 away from the flywheel assembly. With the displacement of pivot pin 34 away from the flywheel assembly, the pressure plate is carried with it to disengage the clutch. With the release of the force on the release lever, compression springs 22 restore engagement of pressure plate 12 with clutch disc assembly 14. Again, as was previously mentioned, while engaged and especially at high rpm's, centrifugally weighted portion 90 tends to rotate the release fingers in a sense to apply a loading force on pins 34 to augment the compression force of the compression springs in maintaining pressure plate 12 in engagement with the clutch disc assembly.

The present invention has been described with reference to certain preferred embodiments. The spirit and scope of the appended claims should not, however, necessarily be limited to the foregoing description.

We claim

1. An improvement in combination with a clutch cover of the type having means for mounting on a flywheel assembly for rotation about the axis of rotation of such assembly, means for housing a pressure plate, means for mounting biasing means to urge the pressure plate into engagement with a clutch disc assembly, and means for pivotally mounting a plurality of release fingers, the improvement comprising:
   a. a plurality of windows equal in number to the number of release fingers;
   b. a pair of bearing flanges at the lateral sides of each window extending inwardly of the window toward the axis of rotation past the inner surface of the clutch cover adjacent the windows for a predetermined distance, the bearing flanges having surfaces for bearing engagement by the release finger mounting means of the pressure plate, which surfaces substantially exceed in bearing area the area of the thickness of the clutch cover adjacent the flanges of the same length as the flanges, the flanges being disposed to prevent relative rotation between the pressure plate and the clutch cover; and
   c. the bearing flanges being formed of parent clutch cover material turned inwardly toward the axis of rotation from the plane of the clutch cover adjacent the flanges.

2. The improvement claimed in claim 1 wherein each of the windows is square shaped with the corners of each square radiused to prevent fatigue failure.

3. An improved clutch comprising:
   a. a pressure plate for engaging a clutch disc assembly;
   b. a plurality of release fingers for disengaging the pressure plate from the clutch disc assembly;
   c. a pair of mounting bosses on the pressure plate for each release finger, each release finger being pivotally secured between an associated pair of mounting bosses to such mounting bosses;
   d. a clutch cover;

e. means for pivotally securing each release finger to the clutch cover such that rotation of the release fingers in a predetermined direction will cause the pressure plate to disengage from the clutch disc assembly;
f. a window in the clutch cover for each release finger; and
g. a pair of bearing flanges at the lateral sides of each window extending inwardly toward the axis of rotation of the clutch for bearing engagement by the mounting bosses associated with the release finger of each window, the bearing flanges extending past the inner surface of the clutch cover adjacent the windows for a predetermined distance to provide bearing areas for engagement by the mounting bosses which substantially exceed the area of the thickness of the clutch cover adjacent the flanges of the same length as the flanges, the flanges being disposed to prevent relative rotation between the pressure plate and the clutch cover, the bearing flanges being formed of parent clutch cover material turned inwardly toward the axis of rotation from the plane of the clutch cover adjacent the flanges.

4. The improved clutch claimed in claim 3 wherein each of the windows is square shaped with the corners of each square radiused to prevent fatigue failure.

* * * * *